United States Patent
Hermann et al.

(10) Patent No.: US 8,177,498 B2
(45) Date of Patent: May 15, 2012

(54) INLET SWIRL CONTROL FOR TURBOCHARGERS

(75) Inventors: Eric Henry Hermann, Ann Arbor, MI (US); Randall Alan Stec, Canton, MI (US); Douglas White, Canton, MI (US); Jacqueline Tomlin, Redford, MI (US); William C. Ronzi, Troy, MI (US); Roger Khami, Troy, MI (US); Robert Bruce Bonhard, Milford, MI (US); Bhaskara Rao Boddakayala, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 521 days.

(21) Appl. No.: 12/427,093

(22) Filed: Apr. 21, 2009

(65) Prior Publication Data

US 2010/0266395 A1 Oct. 21, 2010

(51) Int. Cl.
*F04D 29/44* (2006.01)
*F04D 29/54* (2006.01)

(52) U.S. Cl. ......... 415/200; 415/158; 60/602; 60/605.1; 60/611

(58) Field of Classification Search ............... 415/150, 415/157, 162, 166, 159, 158, 200; 60/602, 60/611
See application file for complete search history.

(56) References Cited

U.S. PATENT DOCUMENTS

| | | | |
|---|---|---|---|
| 6,129,511 A | 10/2000 | Salvage et al. | |
| 6,554,568 B2 | 4/2003 | Fledersbacher et al. | |
| 6,796,296 B2 * | 9/2004 | Kim | 123/590 |
| 7,322,191 B2 * | 1/2008 | Tonetti et al. | 60/605.1 |
| 7,412,830 B2 * | 8/2008 | Sumser | 60/605.1 |

FOREIGN PATENT DOCUMENTS

| | | |
|---|---|---|
| DE | 2060271 | 6/1972 |
| EP | 1416123 | 5/2004 |

* cited by examiner

*Primary Examiner* — David Nhu
(74) *Attorney, Agent, or Firm* — Julia Voutyras; Alleman Hall McCoy Russell & Tuttle LLP

(57) ABSTRACT

An inlet duct, an induction system, and a system are disclosed for directing an inlet flow into an inlet compressor for use in an internal combustion engine. An example inlet duct may include one or more relief features disposed on an inner surface of the inlet duct. The one or more relief features may be made integral with the inlet duct. The one or more relief features may be disposed to protrude into the inlet flow to cause the inlet flow to swirl before reaching the inlet compressor.

19 Claims, 4 Drawing Sheets

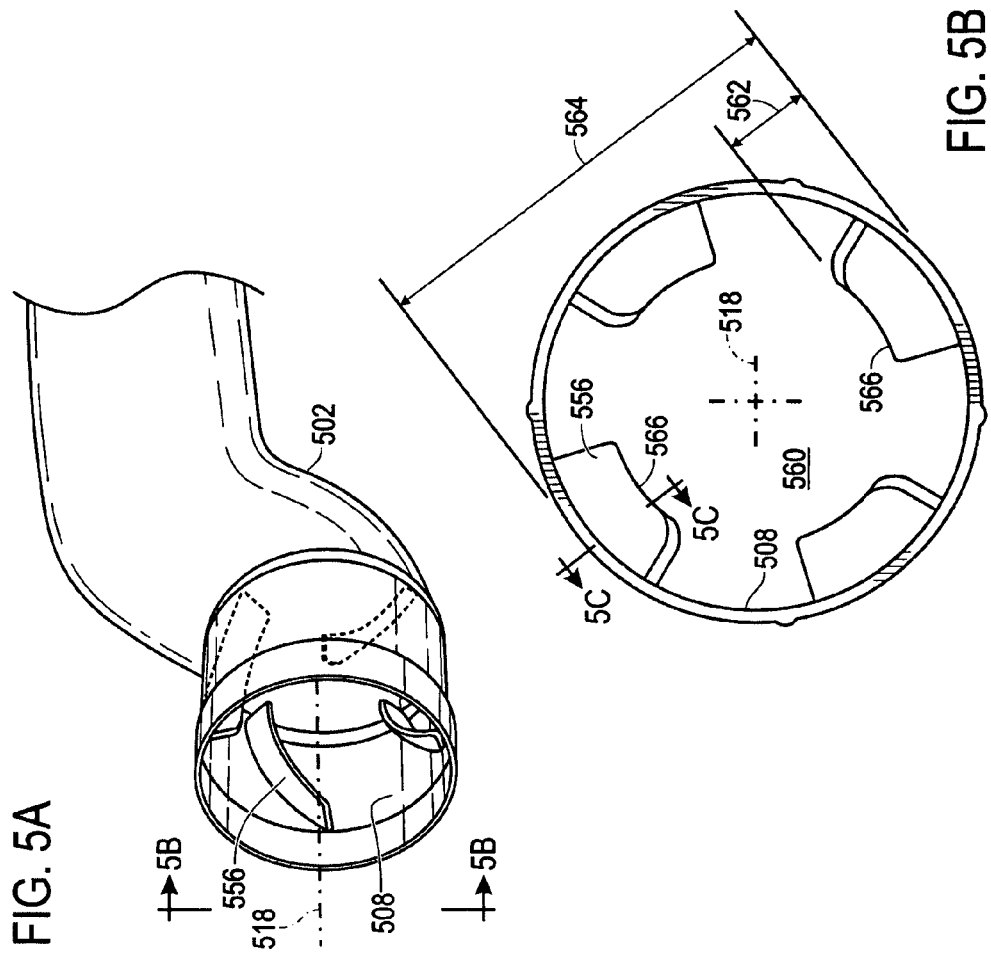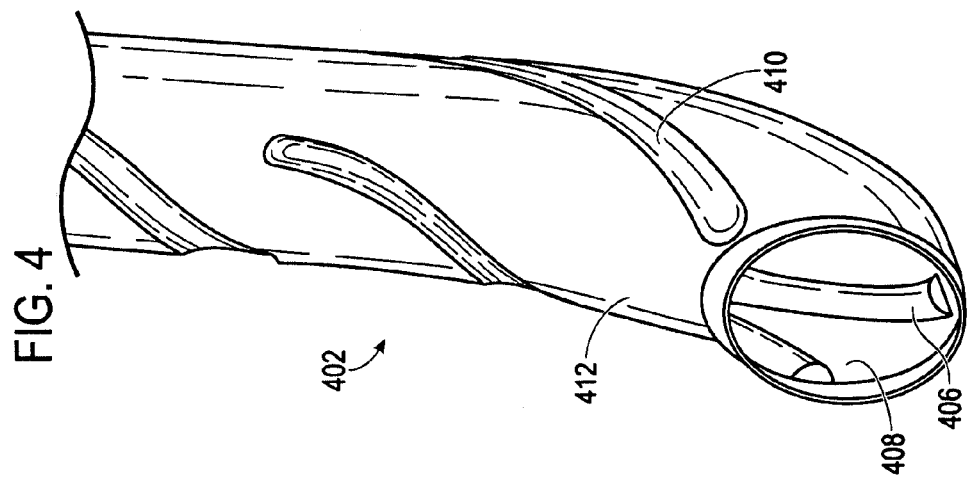

INLET SWIRL CONTROL FOR TURBOCHARGERS

BACKGROUND AND SUMMARY

Turbochargers, and superchargers, may be used with internal combustion engines to increase the mass of air entering the combustion chamber of the engine to create more power. An inlet compressor in the form of, for example, a radial fan pump may be disposed in an inlet duct to compress inlet air. In some cases the inlet compressor may be driven by the energy of the exhaust gases of the engine.

Airflow characteristics at an inlet compressor inlet may affect turbo inlet efficiency and reduce turbulence related noise by providing additional margin to the compressor surge line. Specifically, the direction of swirl relative to the compressor rotation direction can affect both efficiency and noise. If the swirl direction is opposite from the compressor, turbulence and noise can result, sometimes referred to as tip-in whoosh. Inducing a swirl in the same direction as the compressor can result in improved inlet efficiency (higher mass flow rate) and reduced noise generation.

U.S. Pat. No. 7,322,191 discloses a device for imparting a whirling motion on the flow of air for supplying a turbo-supercharged internal-combustion engine. The device is designed to be interposed upstream from the elbow of an elbow-shaped duct. The duct supplies air to the supercharger. The duct has an upstream branch having a square, or rectangular, cross-section, and a downstream branch having a circular section to facilitate formation of a helical flow through the downstream branch. A vane is mounted oscillating about an axis in the upstream branch. In this way, the downstream branch of the elbow portion is reached by a tangential flow that gives rise to the helical flow of the air in the downstream branch. A maximum effect in the generation of the whirling movement is obtained when the vane is at maximum inclination.

The inventors herein have recognized issues relating to this approach. As one example, the approach causes the greatest resistance to flow through the duct to achieve maximum effect in the generation of the whirling movement.

To address the above issues, a duct with highly engineered geometry, potentially via computational fluid dynamics (CFD) or physical test methods, for directing an inlet flow into an inlet compressor of an internal combustion engine may be provided. The inlet duct may include one or more relief features disposed on an inner surface of the inlet duct. The one or more relief features may be disposed to protrude into the inlet flow to cause the inlet flow to swirl before reaching the inlet compressor. In one example, the one or more relief features may be made integral with the inlet duct. Various example embodiments may provide the required swirl ratios with minimal added restriction, cost, manufacturing, and assembly limitations.

Various embodiments may provide elements such as relief features, internal vanes, and/or rifling to compressor inlet ducts to rotate, or swirl an inlet flow before impacting a compressor. The relief features may be formed on an inside surface of the inlet duct by forming troughs in the outside surface. The elements may tune both the direction and magnitude of rotation. The one or more of vanes, rifling, or troughs may be added to the induction system via a variety of methods including, but not limited to, blow molded, injection molded, cast, or hydro-formed metal ducts. In one example, the rifling protrusions from the exterior of the inlet ducts form a screw-shaped pattern to impart rotational flow about the central axis of the duct, the screw-shaped pattern rotating along the length of the duct toward the turbocharger with a rotational direction that is the same as the rotational direction of the compressor.

Various embodiments may be "tuned" during the development process. In this way, an optimal swirl ratio with minimal pressure drop may be achieved.

Various examples may be applied to turbocharged, and/or supercharged, engines for the purposes of inlet efficiency and noise control. Embodiments may be used in various applications including, without limitation, automotive applications, military applications, marine applications, aeronautic applications, and off-road usage.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 4 is a perspective view of another example inlet duct that may be used to direct an inlet flow to a compressor, such as, for example, the compressor illustrated in FIG. 1 or 2.

FIG. 5A is a perspective view of another example inlet duct that may be used to direct an inlet flow to a compressor, such as, for example, the compressor illustrated in FIG. 1 or 2.

FIG. 5B is an end view of the example inlet duct shown in FIG. 5A, as viewed from a direction shown with arrow 5B in FIG. 5A.

FIGS. 3-5 are drawn to scale, although the relative dimensions may be varied from those illustrated, if desired.

DETAILED DESCRIPTION

Figure 1:
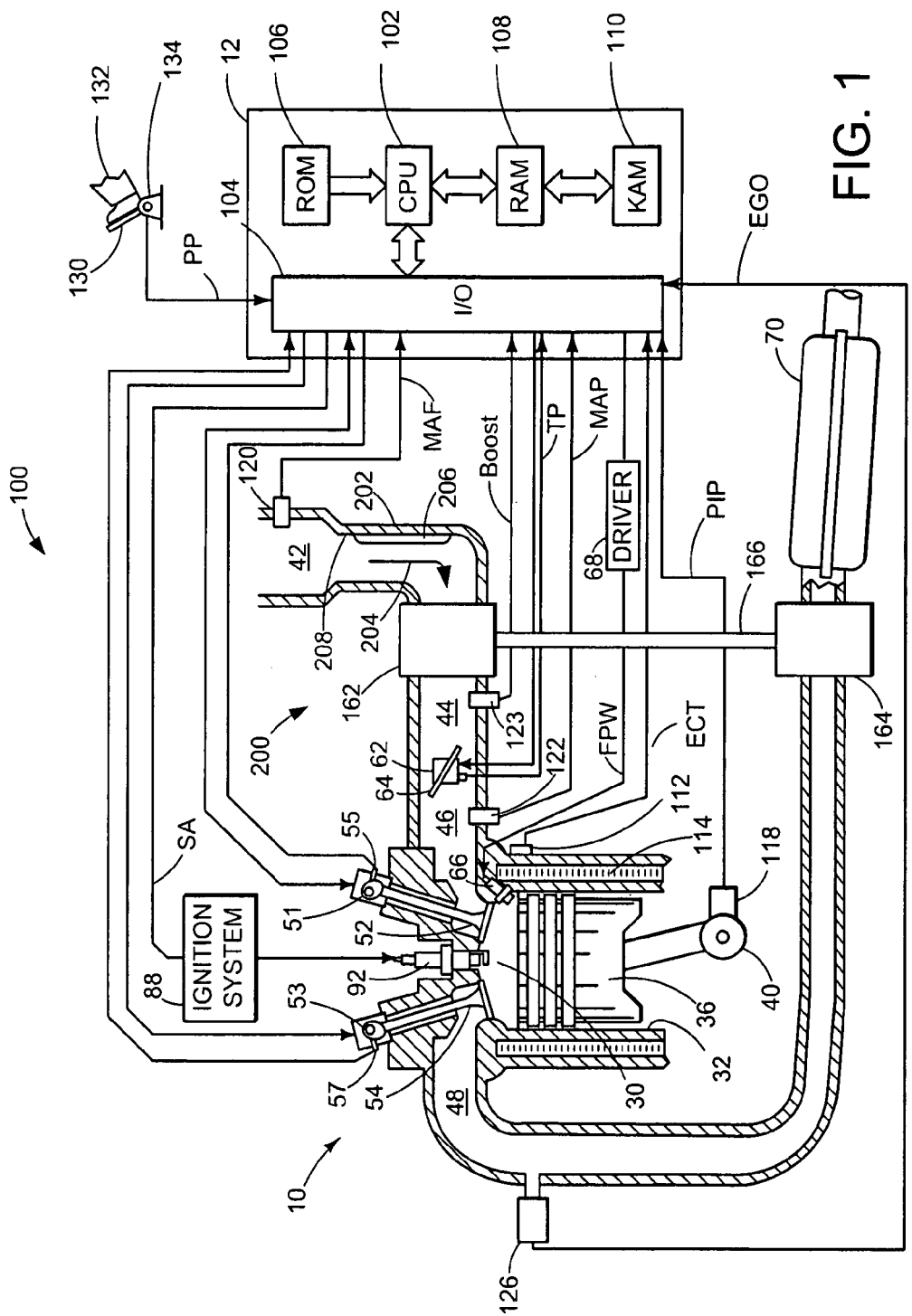
FIG. 1 shows a schematic depiction of a system illustrating a single cylinder of an engine having a turbo-charging compression device, and features to improve the functionality of, and/or to reduce noise associated with, the compression device.

FIG. 1 is a schematic diagram showing one cylinder of multi-cylinder engine 10, which may be included in a propulsion system of an automobile. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft.

Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 162 arranged along intake manifold 44. For a turbocharger, compressor 162 may be at least partially driven by a turbine 164, via, for example a shaft 166. The turbine 164 may be arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

As described above, FIG. 1 shows only one cylinder of a multi-cylinder engine, and that each cylinder may similarly include its own set of intake/exhaust valves, fuel injector, spark plug, etc.

Figures 2A, 2B, 2C:
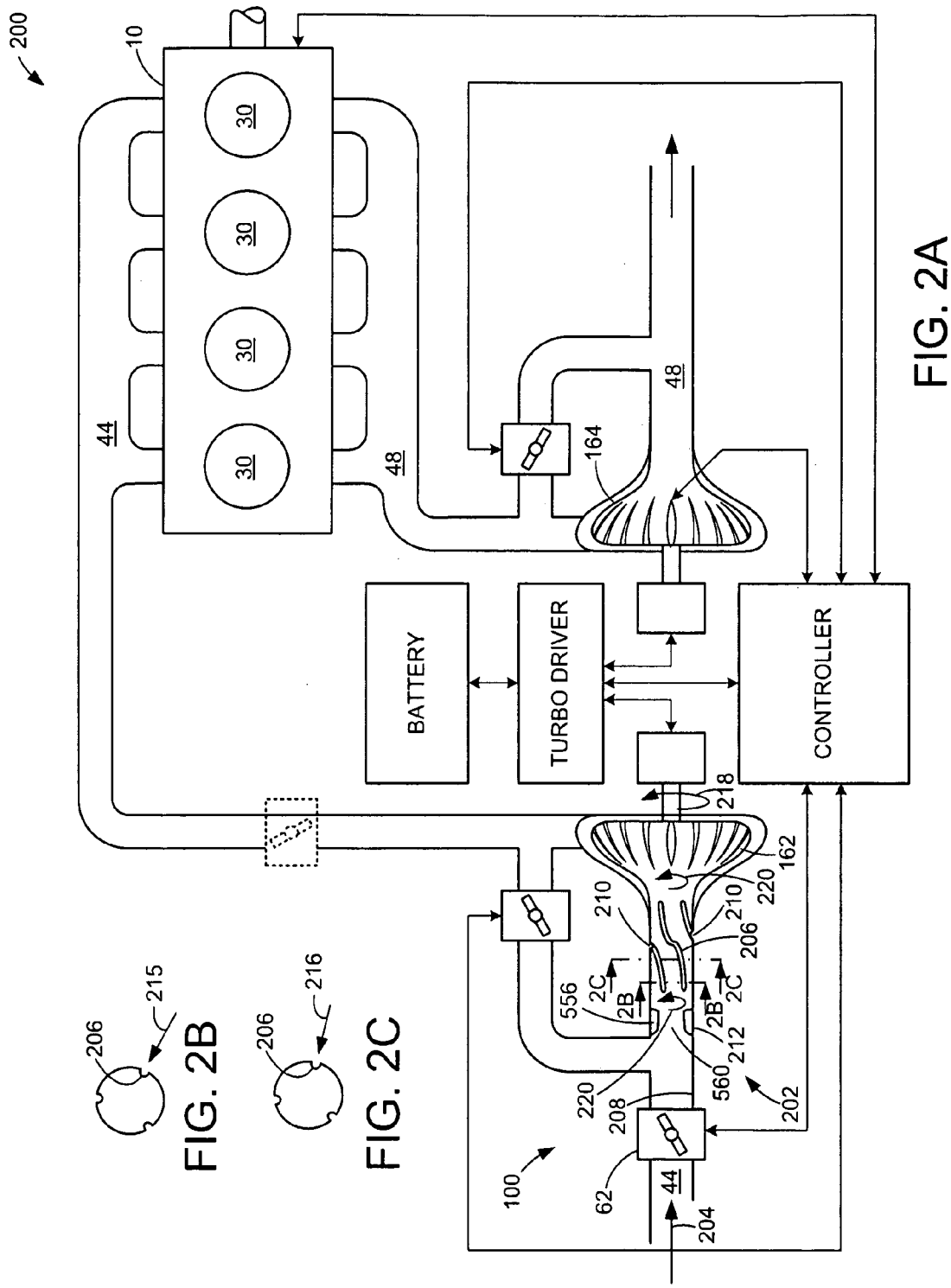
FIG. 2 shows a schematic depiction of a system including an internal combustion engine showing an example four cylinders, a turbo-charging compression device, and features to improve the functionality of, and/or to reduce noise associated with, the compression device.

FIG. 2A is a schematic view illustrating an example engine configuration showing four cylinders, and including many features similar to the example illustrated in FIG. 1. The figures also illustrate some example differences that may be possible in accordance with present disclosure. For example, FIG. 1 illustrates throttle 62 located downstream from the compressor 162, while FIG. 2A illustrates throttle 62 located upstream from the compressor 162.

Referring now to FIG. 1 and to FIG. 2A, wherein as illustrated, an inlet duct 202 may be shaped to direct an inlet flow 204 into an inlet compressor 162 coupled to the internal combustion engine 10. The inlet duct 202 may include one or more relief features 206 on an inner surface 208 thereof. The one or more relief features 206 may be made integral with the compressor inlet duct 202, or otherwise coupled to the compressor inlet duct 202. The one or more relief features 206 may be disposed to protrude into the inlet flow 204 to cause the inlet flow 204 to swirl, or be given a pre-whirl, before reaching the inlet compressor 162. As a result, the surge margin may be improved which may result in noise reduction. In this way, the noise from the compressor 162 may be reduced. For example, noise from a so called "tip-in whoosh" may be reduced. Also, or in some cases instead, mass flow into the compressor may be increased which may result in a more ideal operating point within the compressor map thereby improving thermodynamic efficiency.

The one or more relief features 206 may be fluid directing means. The fluid directing means may be, for example, elongate ridges extending into a path, or inlet flow 204, of the induction fluid. FIGS. 2B and 2C are cross-sectional views taken at lines 2B-2B and 2C-2C respectively in FIG. 2A. FIG. 2B illustrates the elongate ridges extending into the path of the inlet flow at a first circumferential location 215, and FIG. 2C illustrates the elongate ridges extending into the path of the inlet flow at a second circumferential location 216, downstream of the first circumferential location 215. In this example as the elongate ridges extend through the inlet duct 202 from an upstream position shown in FIG. 2B, to a downstream position shown in FIG. 2C, the circumferential position has changed. In this example, the circumferential position of each of the elongate ridges has rotated in a counterclockwise direction as the elongate ridges extend longitudinally in the direction of the flow 204, where the compressor also rotates in a counterclockwise direction.

In some examples, the inlet compressor 162 may spin in a first direction 218, and the relief features may be elongate ridges that extend in a spiral fashion along the inner surface 208 of the inlet duct 202. The elongate ridges may have a circumferential component and a longitudinal component as described. The circumferential component may be in the first direction, e.g. in the same direction as the spin direction of the inlet compressor. The relief features may then cause the inlet flow to swirl in the first direction 220.

The relief features 206 may be formed from recesses, or troughs 210, formed on an outside surface 212 of the inlet duct 202. As stated, in some examples, the relief features 206 may be made integrally with inlet duct. In some examples the inlet duct 202 may be formed using at least one of an injection molding operation, and a blow molding operation. In this way costs may be contained while advantageous functionality may also be achieved. Also, in this way, the structural integrity of the combination of inlet duct 202 with features in accordance with the present disclosure, for example features to reduce noise, may be increased in that they may not move relative to one another. Further, the rigidity and/or stiffness of the ducts themselves may be increased, thus enabling thinner walled, lower weight, inlet ducts.

In some examples, the number of relief features 206, for example, the number of elongate ridges, provided may be three. The inventors herein have recognized that using three elongate ridges may be particularly effective to provide a negative swirl of particular advantage, while still avoiding significant pressure drop. For example, in some examples, the inventors have been able to achieve a negative pre-whirl of approximately 1.05% while only causing a pressure drop of approximately 0.5 kpa. Thus, while in some examples more or less ridges may be used, in the particular example illustrated herein with three ridges, where the angle/pitch of the ridges is as shown in the figures, the unexpected result is achieved that substuially the desired amount of flow rotation is achieved, while minimally impacting flow resistance, as compared with two or four ridges, and/or ridges at other angles/pitches.

Other features, and numbered elements, illustrated in FIGS. 1 and 2, will be made apparent from the following discussion, and the other figures included in the present disclosure.

Figure 3A:
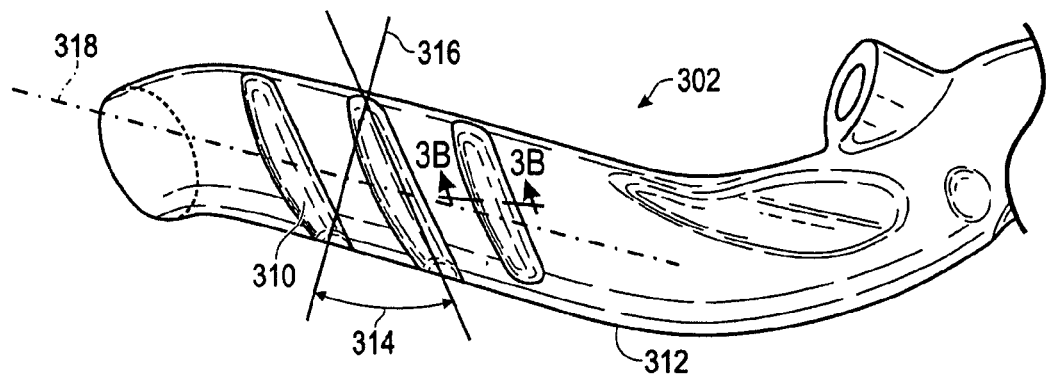
FIG. 3A is a perspective view of an example inlet duct that may be used to direct an inlet flow to a compressor, such as, for example, the compressor illustrated in FIG. 1 or 2.

FIG. 3A is a perspective view illustrating another example inlet duct 302 according to the current disclosure. This example illustrates one or more, for example three, recessed features located on an outside surface 312 of the inlet duct 302. The recessed features may extend into the inlet duct 302, thereby forming one or more relief features 306 located on the inside of the inlet duct 302. The one or more relief features 306 may include three elongate ridges formed from three elongate troughs 310 formed on the outside surface 312 of the inlet duct 302. The three ridges may be substantially parallel to one another, and may be arranged at an angle 314 with a plane 316 normal to a central axis 318 of the inlet duct 302.

Figure 3B:
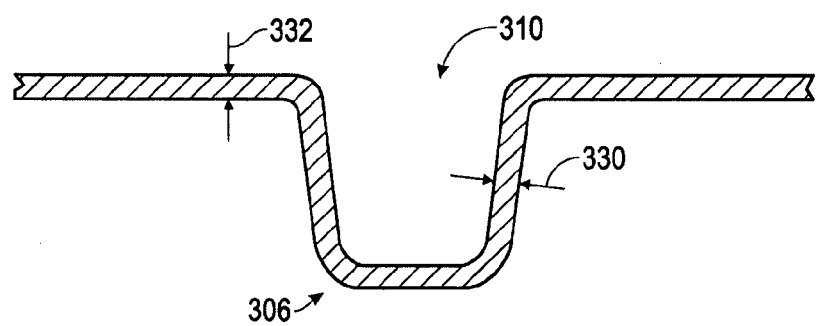
FIG. 3B is a cross-sectional view taken at the line 3B-3B in FIG. 3A.

FIG. 3B is a cross-sectional view taken at the line 3B-3B in FIG. 3A. As mentioned, forming the troughs 310 may be equivalent to forming the relief features 306, in this example, the ridges. The relief features 306 may have a relief feature wall thickness 330, and the inlet duct 302 may have an inlet duct wall thickness 332. In some examples, the relief feature wall thickness 330 may be approximately equal to the inlet duct wall thickness 332. In other examples, the relief feature wall thickness 330 may be different from the inlet duct wall thickness 332. As with some other examples, the inlet duct 302 may be made in a single operation to include the relief features. Example operations may include, but may not be limited to blow molding, injection molding, and the like.

Some examples may provide an inlet duct having relief features which protrude into the inlet flow, but that may not include a corresponding recess formed on the outside surface of the inlet duct. In some cases, relief features formed as such may be made integrally with the inlet duct. In other cases the relief features may be added to the inlet duct, with an attachment operation.

FIG. 4 is a perspective view illustrating another example inlet duct 402 according to the current disclosure. In this example, one or more relief features 406 may include, for example, three ridges forming substantially helical protrusions 406 along an inner surface 408 of the inlet duct 402. In some examples, the one or more relief features 406 may be respectively substantially equally spaced on the inner surface 408. In some examples, the helical protrusions 406 may be formed by providing troughs 410 formed into an outside surface 412 of the inlet duct 402. The relief features 406 may be made integral with the inlet duct 402. In some cases the inlet duct 402 may be made in a single operation. The relief features 406 may be made integrally with the inlet duct 402 using various operations, including, but not limited to blow molding, or injection molding.

The example illustrated shows the helically arranged protrusions 406 on a curved portion of the inlet duct 402. In other examples a straight, or significantly straight, portion of an inlet duct may include helically arranged protrusions. In either case the protrusions may, or may not, include corresponding recesses formed in the outside surface of the inlet duct.

In some examples, the one or more relief features may form a rifling pattern. The rifling pattern may include, various numbers of protrusions extending into the inlet flow.

FIG. 5A is a perspective view illustrating another example embodiment in accordance with the current disclosure showing a portion of an intake duct 502, and FIG. 5B is an end view of the inlet duct 502 shown in FIG. 5A, as viewed from a direction shown with arrow 5B in FIG. 5A. The inlet duct 502 illustrated may include guide vanes 556 extending from an inside surface 508 of the inlet duct 502. The guide vanes 556 may protrude only partway inward, for example toward a central axis 518 of the inlet duct 502, to leave an unobstructed central area 560 in the inlet duct 502. The unobstructed central area 560 may be located between opposite blade tips 566 of the guide vanes 556.

In some examples, the number of guide vanes 556 may be four. The guide vanes 556 may be substantially equally spaced within the inlet duct 502.

As described earlier, the inlet compressor may spin in a first direction. In some examples, the guide vanes 556 may be arranged in the inlet duct 502 to have a circumferential component and a longitudinal component. The circumferential component may also be in the first direction. The guide vanes may cause the inlet flow to swirl, also, in the first direction.

In some examples, the guide vanes 556 may each extend toward the central axis 518 of the inlet duct 502 a predetermined amount 562 relative to a diameter 564 of the inlet duct 502. The inventors herein have recognized that by providing an unobstructed central area 560 having a particular predetermined size relative to a total cross-sectional area of the inlet duct 502 may be particularly effective to provide a negative pre-whirl of particular advantage, while still avoiding significant pressure drop. For example, in some embodiments, the inventors have been able to achieve a negative pre-whirl of 52.3% while only causing a 1.6 kpa pressure drop. In some examples, the distance between the opposite blade tips 566 may be approximately equal to between one half and three fourths of the diameter 564 of the inlet duct 502. Included among such examples, the distance between opposite blade tips 566 may be approximately equal to two thirds of the diameter 564 of the inlet duct 502. In other words, in some cases, the guide vanes 556 may each extend toward the central axis 518 a distance 562 of approximately one sixth of the diameter 564 of the inlet duct 502.

The guide vanes 556 may be included in an inlet duct that may also include fluid directing means that may be the same, or similar to, the relief features described herein. The guide vanes 556, and the relief features, may be shaped and positioned to work cooperatively to advantageous effect, such as to provide improved pre-swirl, and/or reduced pressure drop. In some examples, the guide vanes 556 may be located upstream from the one or more relief features. In other examples, the guide vanes 556 may be located downstream from the one or more relief features.

In some examples, the guide vanes 556 may be used in an inlet duct without the fluid directing, or relief features such as those illustrated herein. Further, in some cases, the relief features discussed herein may be included in an inlet duct without guide vanes such as those illustrated herein.

In some cases, the fluid directing, or relief, features may be configured similar to the guide vanes 556 illustrated herein. The guide vanes 556 may be formed integrally with the inlet duct 502. In addition, the guide vanes 556, when included with relief features, may both be formed integrally with the inlet duct 502. Integral formation, of various combinations of the elements described herein may, in some cases, be achieved using a blow molding operation, an injection molding operation, a casting operation, a hydro-forming operation, or the like.

Figure 5C:
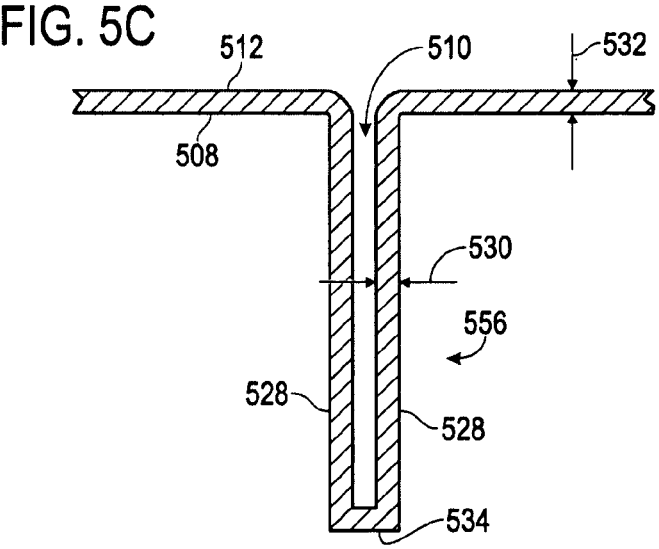
FIG. 5C is a cross-sectional view taken at the line 5C-5C in FIG. 5B.

FIG. 5C, illustrates a cross-sectional view taken at the line 5C-5C in FIG. 5B. One or more of the guide vanes 556 may be formed on an inside surface 508 of the inlet duct 502 by forming troughs 510 on an outside surface 512 of the inlet duct 502. Each guide vane 556 may have opposing walls 528 on either side of the guide vane trough 510. A trough bottom 534 may close the trough 510. One or both of the opposing walls 528 may have a trough wall thickness 530, and the inlet duct may have a duct wall thickness 532. In some cases, the trough wall thickness 532 may be approximately equal to the duct wall thickness 530. In other cases, the trough wall thickness 530, and the duct wall thickness 532, may be different.

In some cases, one or more of the example inlet ducts disclosed herein may be all or part of a primary compressor inlet duct. In some examples, one or more of the example inlet ducts may be used as all of, or part of, or with a primary turbo runner. In addition, or instead, one or more of the example inlet ducts may be used as all of, or part of, a secondary turbo runner.

Returning again to FIGS. 1 and 2, various example embodiments are illustrated that may include an induction system 100 for use in an internal combustion engine 10. The induction system 100 may provide an inlet compressor 162 configured to compress an induction fluid, and to pass the induction fluid to a combustion chamber 30. An inlet duct 202 may be provided for directing the induction fluid toward the inlet compressor 162. Relief features 206 may be formed as part of the inlet duct 202. The relief features 206 may be sized and shaped to cause the induction fluid to swirl before reaching the inlet compressor 162.

Also illustrated is an example system 200 for directing an inlet flow toward an inlet compressor 162 for use in an internal combustion engine 10. The system 200 may include three elongate protrusions 206 integrally formed in relief on an inside surface 208 of an inlet duct 202 by three corresponding troughs 210 formed on an outside surface 212 of the inlet duct 202. The protrusions 206 may extend into the inlet duct 202 to cause the inlet flow 204 to swirl. The number of geometric features may be application dependent, and may be best defined by CFD analysis in conjunction with dynamometer confirmation.

Some other examples may include insertion of scrolls, springs, or a separate vane assembly into an inlet duct.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An inlet duct for directing an inlet flow into an inlet compressor coupled in an internal combustion engine, the inlet duct comprising:

one or more relief features disposed on an inner surface of the inlet duct, the one or more relief features protruding into the inlet flow to cause the inlet flow to swirl before reaching the inlet compressor, the one or more relief features integral with the inlet duct and forming a rifling pattern.

2. The inlet duct of claim 1, wherein the one or more relief features includes three elongate ridges formed from three corresponding troughs formed on an outer surface of the inlet duct.

3. The inlet duct of claim 1, wherein the one or more relief features includes three ridges being substantially parallel to one another and arranged at an angle with a plane normal to a central axis of the inlet duct.

4. The inlet duct of claim 1, wherein the one or more relief features includes three ridges forming substantially helical protrusions along the inner surface, the one or more relief features being respectively substantially equally spaced on the inner surface.

5. The inlet duct of claim 1, further comprising guide vanes extending from the inner surface of the inlet duct, wherein the guide vanes protrude only partway toward a central axis of the inlet duct to leave an unobstructed central area in the inlet duct.

6. The inlet duct of claim 5, wherein the inlet compressor spins in a first direction, and wherein the guide vanes are located upstream from the one or more relief features, the guide vanes being arranged in the inlet duct to have a circumferential component and a longitudinal component wherein the circumferential component is in the first direction, and wherein the guide vanes cause the inlet flow to swirl in the first direction.

7. The inlet duct of claim 1, wherein the inlet compressor spins in a first direction, and wherein the one or more relief features are elongate ridges that extend in a spiral fashion along the inner surface of the inlet duct, the elongate ridges having a circumferential component and a longitudinal component wherein the circumferential component is in the first direction, and wherein the one or more relief features cause the inlet flow to swirl in the first direction.

8. The inlet duct of claim 1, wherein the inlet compressor is driven by a turbine disposed in an exhaust passage of the engine.

9. An induction system for use in an internal combustion engine comprising:
an inlet compressor configured to compress an induction fluid, and positioned to pass the induction fluid to a combustion chamber;
an inlet duct for directing the induction fluid toward the inlet compressor, the inlet duct positioned upstream and coupled to the inlet compressor; and
fluid directing means formed as part of the inlet duct, the fluid directing means being sized and shaped to cause the induction fluid to swirl before reaching the inlet compressor.

10. The induction system of claim 9, wherein the fluid directing means are elongate ridges extending into a path of the induction fluid formed from troughs formed on an outside surface of the inlet duct.

11. The induction system of claim 10, wherein the elongate ridges are three in number.

12. The induction system of claim 11, wherein the elongate ridges are substantially parallel to one another and form an angle with a cross-sectional plane normal to a central axis of the inlet duct.

13. The induction system of claim 9, wherein the fluid directing means include three ridges forming substantially helical protrusions along an inside surface of the inlet duct and being respectively substantially equally spaced on the inside surface.

14. The induction system of claim 9, wherein the fluid directing means are guide vanes extending partway into a path of the induction fluid leaving an unobstructed central area between opposite tips of the guide vanes.

15. The induction system of claim 14, wherein a distance between the opposite tips of the guide vanes is approximately equal to between one half and three fourths of a diameter of the inlet duct.

16. The induction system of claim 15, wherein the distance between the opposite tips of the guide vanes is approximately equal to two thirds of the diameter of the inlet duct.

17. A system for directing an inlet flow toward an inlet compressor for use in an internal combustion engine comprising:
three elongate protrusions integrally formed in relief on an inside surface of an inlet duct by three corresponding troughs formed on an outside surface of the inlet duct, the three elongate protrusions extending into the inlet duct to cause the inlet flow to swirl; and
guide vanes extending from the inside surface of the inlet duct, the guide vanes sized and shaped to protrude only partway toward a central axis of the inlet duct to leave an unobstructed central area, the guide vanes are positioned upstream of the three elongate protrusions, wherein the guide vanes each extend toward the central axis of the inlet duct an amount approximately equal to one sixth of a diameter of the inlet duct, and wherein the central area is located between opposite blade tips of the guide vanes, wherein the opposite blade tips are approximately equal to two thirds of the diameter of the inlet duct.

18. The system of claim 17, wherein the guide vanes are formed integrally with the inlet duct.

19. The system of claim 17, wherein each guide vane is shaped as a guide vane trough in the outside surface of the inlet duct, each guide vane having opposing walls on either side of the guide vane trough, a trough bottom closing the trough, wherein each opposing wall has a trough wall thickness, and the inlet duct has an inlet duct wall thickness wherein the trough wall thickness is approximately equal to the inlet duct wall thickness.

* * * * *